R. MATHESON.
VEGETABLE HARVESTER.
APPLICATION FILED NOV. 8, 1915.

1,256,713.

Patented Feb. 19, 1918.
2 SHEETS—SHEET 1.

WITNESSES:
Leonard Struewe
Lehman H. Crandall

INVENTOR
Robert Matheson
BY
ATTORNEY

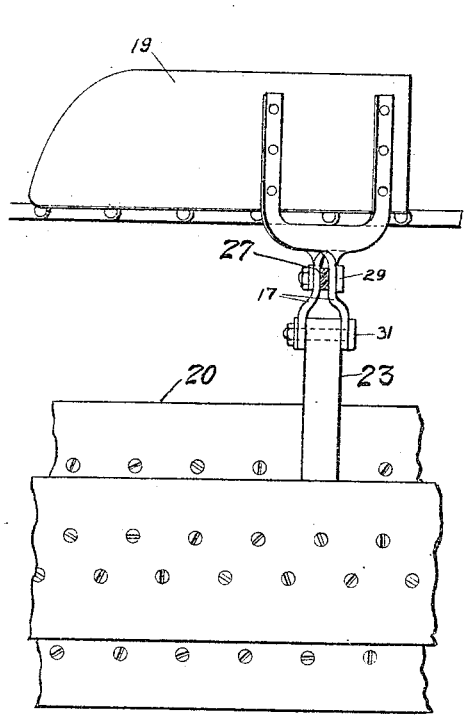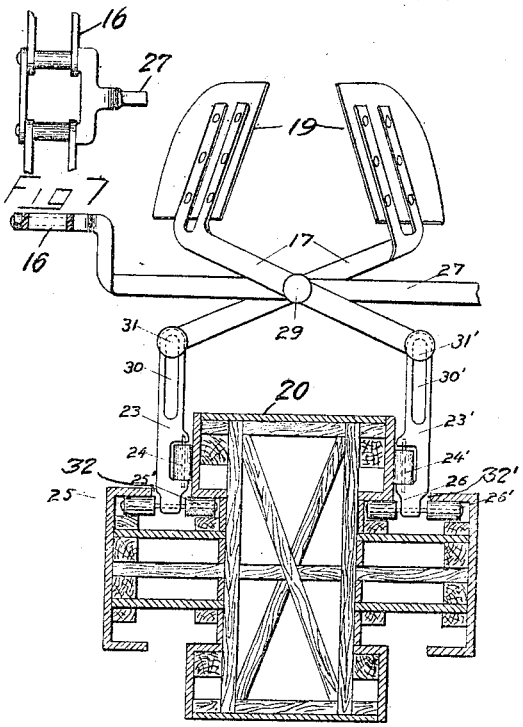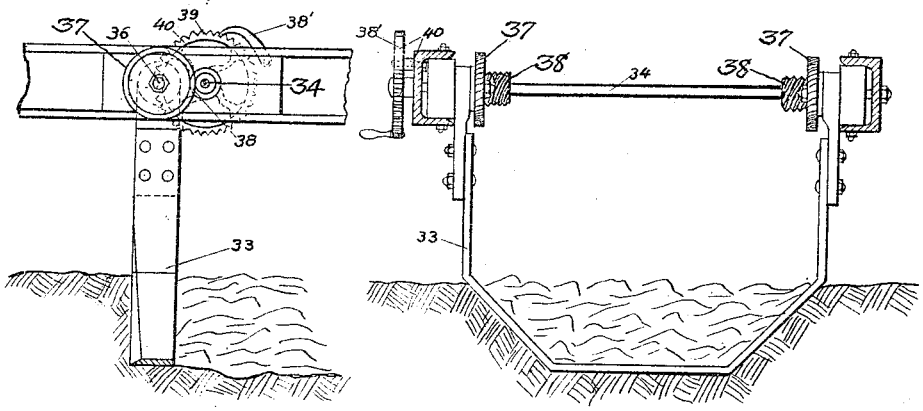

UNITED STATES PATENT OFFICE.

ROBERT MATHESON, OF LOS ANGELES, CALIFORNIA, ASSIGNOR OF ONE-FOURTH TO LESTER F. ALLEN AND ONE-FOURTH TO WILLIAM ALLEN, BOTH OF LOS ANGELES, CALIFORNIA.

VEGETABLE-HARVESTER.

1,256,713.  Specification of Letters Patent.  Patented Feb. 19, 1918.

Application filed November 8, 1915. Serial No. 60,315.

*To all whom it may concern:*

Be it known that I, ROBERT MATHESON, a citizen of the United States, residing at Los Angeles, in the county of Los Angeles and State of California, have invented certain new and useful Improvements in Vegetable-Harvesters, of which the following is a clear and full specification.

My invention relates to improvements in vegetable harvesters, and particularly to that class of machines in which the vegetables are loosened in the soil by means of a special knife-like plow-blade, which also severs the tap root from the body of the vegetables, simultaneously with the loosening operation, and after such loosening operation, the machine grasps the vegetable and extracts it completely from the soil, elevates it, severs the top therefrom, depositing the tops and bodies upon separate conveyers, which in turn deposits them in rows upon the ground or in receptacles arranged for their reception. Such receptacles are not shown; as no claim is made embodying them, illustration is thought to be unnecessary.

This machine is designed to be built up in units as regards width, but only one unit is shown in the illustration, but it will be readily understood that as many units may be employed as desired.

It will also be seen that to obtain the highest efficiency of the device, the vegetables should be cultivated in rows or drills.

The prime object of this invention is to produce a machine which will be at once cheaply constructed, efficient in operation and not liable to derangement.

Figure 1, (Sheet 1.) is a side elevation of a device embodying the principal features of my invention, several of the wheels being shown in skeleton form in order to avoid confusion in the drawings.

Figure 1:
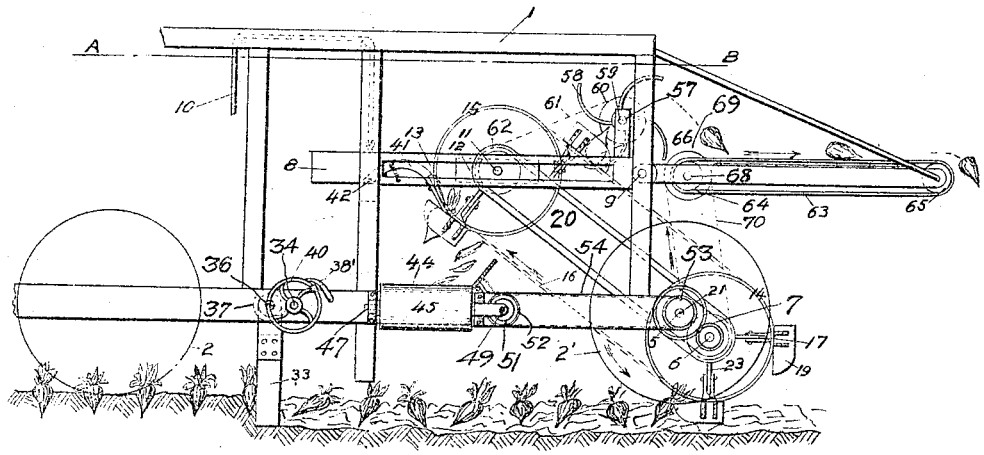
Figure 2:
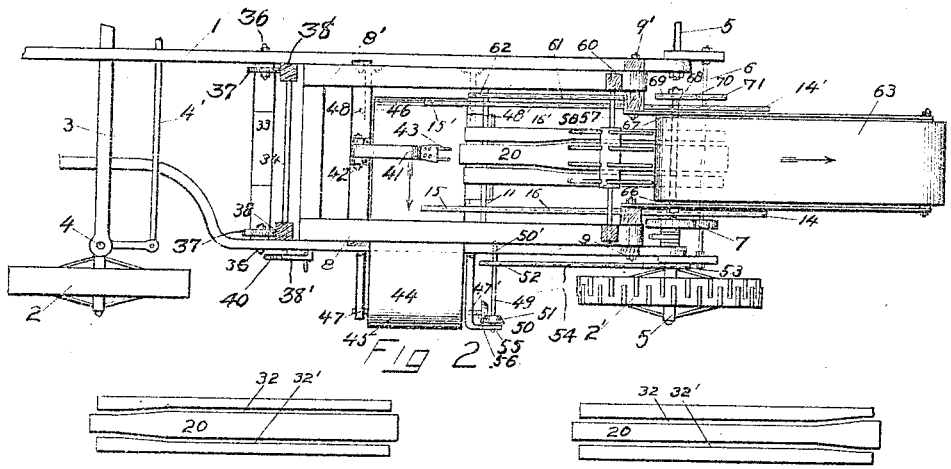
Fig. 2, is a plan view of the lower portion of the machine taken on line A, B, Fig. 1.

Fig. 5, (Sheet 2.) is an enlarged detail of one of the grippers, and a section of the gripper control and the conveyer chain.

Fig. 6, is a view in cross section of the gripper control; the gripper mechanism being shown in elevation.

Fig. 7, is a plan view of one end of a gripper supporting rod.

Fig. 8, is an enlarged detail in side elevation of the soil loosening and root-cutting plow-blade, showing the manner of holding and operating the same.

Fig. 9, is an end view of the part illustrated in Fig. 8.

Similar characters of reference denote like parts throughout the several views.

1, is the frame of the machine, which may be made of any suitable material, but is preferably of iron and wood, 2, and 2', are the traction wheels, and are similar to those usually employed in the construction of agricultural machinery 3, is the front axle upon which the frame of the machine is mounted in the usual manner of kindred machines, the wheels being pivoted to the said axle at 4, and operated in unison by means of a connection rod 4'.

5, is the rear axle of the machine to which the traction wheel 2', is made secure, and a counter-shaft 6, is journaled in bearings, and is alined parallel with the rear axle 5.

The rear axle 5, and the counter-shaft 6, are geared together as shown at 7, the ratio existing between the two, being left to the discretion of the builder, to meet the various requirements imposed by different soil conditions.

8, and 8', are side frame sections pivoted at 9, and 9', to the stationary frame work 1, and are arranged so that the forward ends thereof may be raised simultaneously by means of the cable 10, or by any other approved means.

A shaft 11, is journaled to the sliding boxes 12, and arranged to slide in the slots 13, in the frame portions 8, and 8', of which however only one of each is shown in position upon the front side of the pivoted side frame section 8, in Fig. 1.

Sprocket wheels 14, and 14', and 15, and 15', are mounted respectively upon the counter-shaft 6, and the shaft 11, and carrier chains 16, and 16', upon which are mounted the gripper levers 17, which carry the grippers 19.

A gripper control 20, is pivoted to a rigid portion of the frame 1, as at 21, for a purpose which will be more fully explained later on. The bearings for the shaft 6 are fixed to the gripper control 20.

Gripper actuators 23, and 23', are provided with vertical rolls 24, and 24', respectively, together with the horizontal rolls 25, and 25', and 26, and 26', also in pairs respectively, all of which are well illustrated in Fig. 6, of Sheet 2.

27, is the gripper supporting bar, which has its ends so formed as to combine with the conveyer chains 16, and 16', to form one of the links thereof, and is very clearly shown in Sheet 2, Fig. 7.

The gripper 19, is pivoted to the gripper bar 27, at 29, and is well illustrated in Fig. 6, Sheet 2.

The gripper actuators 23, and 23', are provided at their upper ends with slots 30, and 30', respectively, for the reception of the studs 31, and 31', upon the ends of the gripper-levers 17, and are shown in Fig. 6, Sheet 2; their purpose will appear later on.

The upper end of the gripper control 20, is pivoted upon the shaft 11, and as will be seen by raising or lowering the pivoted side frame sections 8, and 8', the lower end of the gripper control 20, will be lowered or raised accordingly so that the grippers 19, may be adjusted to the most suitable position for grasping and extracting the vegetable. The lower pivot at 21 of the gripper control 20 is in line with the axles 5 and is some distance above the lower end of the control and the control tilts on this pivot so that as the upper end is lowered the lower end is raised, and vice versa.

Figures 3, 4:
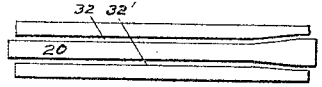
Fig. 3, is a plan view of the gripper control.
Fig. 4, is a bottom view of the same.

The gripper control 20, is provided with peripheral slots 32, and 32', which run parallel to each other through one section of their length, converge toward each other in another section, diverge from each other in another section and again parallel each other in another and final section, thereby completing their cycles and forming a pair of cam slots, within which are confined, guided, controlled and travel the gripper actuators 23, and 23', and said slots are well illustrated in the top and bottom views respectively Figs. 3 and 4.

As will be readily seen the courses traversed by the gripper actuators 23, and 23', as they are drawn around the gripper control 20, will cause the grippers 19, to be closed at a predetermined point of their travel, remain closed through a predetermined portion of their travel, opened at a further predetermined point and remain open during the remainder of their cycle of travel, the purpose of which will be later explained.

An approximately U-shaped plow-blade 33 is pivoted at its upper ends to the forward part of the frame by bolts 36, and the gears 37 upon said bolts are fixed to the ends of the plow-blade. A shaft 34 extends across the frame parallel with the pivot bolts 36 and gears 38 upon this shaft mesh with the gears 37.

A hand wheel 40 is fixed upon the shaft 34 and has teeth 39 upon its periphery. A pawl 38' is pivoted to the frame and engages the teeth 39. The position of the plow-blade 33 is adjusted by manipulating the hand wheel 40 and is held in adjusted position by the pawl 38'.

A knife 41, is pivoted to the frame at 42, and is arranged to sever the top from a vegetable held in the gripper 19, as it is conveyed upwardly therein, and the said knife is provided with guards 43, between which the top of the vegetable being operated upon is passed, said guards being arranged to contact with and protect the body of the vegetable and thereby prevent the knife from gouging or mutilating the body thereof, and by reason of the said guards contacting with, and resting upon the body of said vegetable it will be seen that after severing the top therefrom, the knife will be raised or swung upwardly about its pivot and thereby allow the gripper bearing its contents to pass on around the gripper control, when the said knife 41, will again drop to its normal position by gravity in time to operate upon the next vegetable presented by the succeeding on-coming grippers, or if no vegetable is presented by the grippers, then the guards 43, will engage the gripper bars 27, and be raised and carried upwardly out of its path of travel and again dropped in readiness for the next gripper or the contents thereof.

A conveyer belt is arranged directly below the point where the top of the vegetable is severed, and is designated by the number 44.

The conveyer belt 44, is mounted upon drums 45, and 46, which in turn are journaled in the frame-work 1, at 47, and 47', and 48, and 48'.

A short shaft 49, is journaled in the frame work at 50, and 50', and carries the bevel gear 51, and the sprocket wheel 52, which is in direct connection with the sprocket wheel 53, upon the inner face of the traction wheel 2', through the chain 54.

The bevel gear 51, mates with the bevel gear 55, upon the outer end of the axis 56, of the drum 45, and thereby communicates motion to the conveyer belt 44.

A rotary conveyer consisting of a shaft 57, provided with fingers 58, is journaled to the frame work at 59, and carries a sprocket wheel 60, and is impelled by the chain 61, which in turn is driven from the sprocket wheel 62, upon the shaft 11.

A conveyer belt 63, is carried upon the drums 64, and 65, which are journaled to the frame work 1, at 66, and 67, respectively.

The drum 64, is chain driven from the shaft 6, the axle 68, of the drum 64, being provided with the sprocket wheel 69, which is driven by the chain 70, which in turn is actuated by the sprocket wheel 71, upon the aforesaid shaft 6.

The operation of the device is as follows:

When the machine is propelled over the rows of vegetables to be harvested, care is exercised to so guide the machine that the plow-blade 33, will form a loop about the vegetables as it travels forward over the rows, thereby loosening the soil upon each side and below the said vegetables and simultaneously severing the tap roots therefrom.

As the machine proceeds, the grippers 19, are traversed about the gripper control 20, so as to pass upward upon the lower side thereof, and as they pass around the lower end of the gripper control, they are adjusted so that they will consecutively dip into the loose soil upon each side of the vegetables to be harvested, and when at their lowest point of travel, the diverging slots of the gripper control 20, act through the gripper actuators 23, and 23', to close the said grippers, when as will be readily seen if a vegetable occupied a position between said grippers at the time of closing, that it would be grasped firmly therebetween and by the forward movement thereof, be extracted from the soil and carried upward along the lower side of the gripper control, and into contact with the knife 41, and the guides 43, the said guides serving to protect the body of the vegetable from injury as the top is severed therefrom; the said top when thus severed falls by gravity upon the conveyer belt 44, which is located directly below the said knife, and upon which it is conveyed to its ultimate destination.

After the top of the vegetable is severed from the body, the said body is still carried upward and onward by the grippers, and by reason of the guides 43, the knife 41 is raised and carried upward out of the path of travel of the grippers, said knife 41, swinging about its pivot 42, and as soon as the gripper with its contents has passed upward and beyond the said knife, it will be restored to its normal position by gravity, and in time to operate upon the succeeding gripper or its contents as the case may be.

When the gripper has carried the vegetable around the end of the gripper control, and starts to descend upon the upper side of the said control, the cam slots 32, and 32', act through the gripper actuators 23, and 23', to open the grippers and release the contents thereof, which are caught by the fingers 58, of the rotary conveyer and raised and carried over the shaft 57, and deposited upon the conveyer belt 63, which carries them to their destination.

As will be seen by reference to the drawings, the gripper control 20, may be tilted at different angles by manipulating the cable 10, which will in turn raise or lower the grippers so that the most favorable position may be obtained for operating upon the vegetables to be harvested.

It will also be readily discernible that the U-shaped plow-blade 33, may be regulated to any desired depth through the manipulation of the hand wheel 40, and its depending mechanism.

As stated in the preamble the machine may be composed of a number of units, thereby making it possible to operate upon a number of rows of vegetables at one and the same time, this being possible by connecting as many units like the one described, side by side as may be deemed desirable.

Having thus described my invention, what I claim and desire to secure by Letters Patent is—

1. In a vegetable harvester, an endless chain conveyer system having grippers mounted thereon and adapted to be opened and closed at predetermined locations along their line of travel, said grippers adapted to grasp and extricate a vegetable from the soil when within their scope at the instant of closing, a pivoted knife in the line of travel of such vegetable's top, and adapted to sever the same from the body of the said vegetable, a conveyer belt arranged to travel at right angles to said gripper conveyer and below the same and adapted to catch the severed tops of said vegetables and convey them to their predetermined destination, all arranged and operating substantially as shown and described.

2. In a vegetable harvester, an endless chain conveyer system provided with a plurality of automatically operated grippers adapted to grasp and extricate vegetables from the soil, and a pivoted knife located within the path of travel of said vegetables, and arranged to sever the tops therefrom, a rotary conveyer located above the chain conveyer system, and a conveyer belt located below the said rotary conveyer, means for releasing the said vegetables within the path and scope of said rotary conveyer, said rotary conveyer being adapted to raise the said vegetables and deposit them upon the said conveyer belt upon which they are carried to their destination, all arranged and operating as described and for the purpose set forth.

In testimony whereof I affix my signature in the presence of two witnesses.

ROBERT MATHESON. [L. S.]

Witnesses:
 WM. ALLEN,
 R. W. BULL.

Copies of this patent may be obtained for five cents each, by addressing the "Commissioner of Patents, Washington, D. C."